(12) United States Patent
Ford et al.

(10) Patent No.: US 10,706,615 B2
(45) Date of Patent: Jul. 7, 2020

(54) DETERMINING AND/OR GENERATING DATA FOR AN ARCHITECTURAL OPENING AREA ASSOCIATED WITH A CAPTURED THREE-DIMENSIONAL MODEL

(71) Applicant: Matterport, Inc., Mountain View, CA (US)

(72) Inventors: Daniel Ford, Mountain View, CA (US); David Alan Gausebeck, Mountain View, CA (US); Gunnar Hovden, Los Gatos, CA (US); Matthew Tschudy Bell, Palo Alto, CA (US)

(73) Assignee: Matterport, Inc., Sunnyvale, CA (US)

( * ) Notice: Subject to any disclaimer, the term of this patent is extended or adjusted under 35 U.S.C. 154(b) by 216 days.

(21) Appl. No.: 14/962,867

(22) Filed: Dec. 8, 2015

(65) Prior Publication Data

US 2018/0144555 A1    May 24, 2018

(51) Int. Cl.
*G06T 15/04* (2011.01)
*G06T 15/20* (2011.01)
*G06T 15/50* (2011.01)

(52) U.S. Cl.
CPC .......... *G06T 15/506* (2013.01); *G06T 15/04* (2013.01); *G06T 15/20* (2013.01); *G06T 2210/04* (2013.01); *G06T 2215/12* (2013.01)

(58) Field of Classification Search
None
See application file for complete search history.

(56) References Cited

U.S. PATENT DOCUMENTS

| | | | | |
|---|---|---|---|---|
| 2006/0221072 | A1* | 10/2006 | Se | G01C 11/06 345/420 |
| 2008/0071559 | A1* | 3/2008 | Arrasvuori | G06Q 30/06 705/26.1 |
| 2010/0275018 | A1* | 10/2010 | Pedersen | G06T 19/00 713/168 |
| 2011/0140928 | A1* | 6/2011 | Ren | G01C 21/3638 340/995.14 |
| 2012/0229445 | A1* | 9/2012 | Jenkins | G06T 15/60 345/418 |
| 2012/0249539 | A1* | 10/2012 | Bhattacharya | G06T 19/003 345/419 |
| 2013/0147798 | A1* | 6/2013 | Karsch | G06T 19/006 345/420 |
| 2013/0259308 | A1* | 10/2013 | Klusza | G06K 9/00624 382/103 |
| 2013/0271462 | A1* | 10/2013 | Frank | G06Q 50/16 345/420 |

(Continued)

*Primary Examiner* — Michael J Cobb
(74) *Attorney, Agent, or Firm* — Ahmann Kloke LLP

(57) ABSTRACT

Systems and techniques for determining and/or generating data for an architectural opening area associated with a three-dimensional (3D) model are presented. A portion of an image associated with a 3D model that corresponds to a window view or another architectural opening area is identified based at least in part on color data or depth data. Furthermore, a surface associated with the 3D model and visual data for the window view or the other architectural opening area is determined. The visual data for the window view or the other architectural opening area is applied to the surface associated with the 3D model.

22 Claims, 12 Drawing Sheets

(56) References Cited

U.S. PATENT DOCUMENTS

| | | | | |
|---|---|---|---|---|
| 2014/0247280 A1* | 9/2014 | Nicholas | ............... | G06F 3/011 |
| | | | | 345/633 |
| 2014/0313203 A1* | 10/2014 | Shugart | ............... | G06T 19/003 |
| | | | | 345/427 |
| 2014/0320488 A1* | 10/2014 | Ege | ............... | G06T 17/05 |
| | | | | 345/420 |
| 2015/0077592 A1* | 3/2015 | Fahey | ............... | G06T 19/006 |
| | | | | 348/239 |
| 2015/0094089 A1* | 4/2015 | Moeglein | ............... | H04W 4/029 |
| | | | | 455/456.1 |
| 2015/0123965 A1* | 5/2015 | Molyneaux | ............... | G06T 19/20 |
| | | | | 345/419 |
| 2015/0262421 A1* | 9/2015 | Bell | ............... | G06T 17/20 |
| | | | | 345/423 |
| 2016/0012160 A1* | 1/2016 | Mohacsi | ............... | G06T 19/003 |
| | | | | 703/1 |
| 2016/0055268 A1* | 2/2016 | Bell | ............... | G06F 17/5004 |
| | | | | 703/1 |
| 2016/0379418 A1* | 12/2016 | Osborn | ............... | G06T 19/20 |
| | | | | 345/589 |
| 2017/0053439 A1* | 2/2017 | Honda | ............... | G06F 30/00 |
| 2017/0132835 A1* | 5/2017 | Halliday | ............... | G06K 9/00214 |
| 2017/0345208 A1* | 11/2017 | Ashdown | ............... | G06F 30/23 |
| 2018/0144535 A1* | 5/2018 | Ford | ............... | G06T 15/005 |
| 2018/0144555 A1* | 5/2018 | Ford | ............... | G06T 15/04 |
| 2018/0253894 A1* | 9/2018 | Krishnan | ............... | G06T 15/08 |

* cited by examiner

DETERMINING AND/OR GENERATING DATA FOR AN ARCHITECTURAL OPENING AREA ASSOCIATED WITH A CAPTURED THREE-DIMENSIONAL MODEL

TECHNICAL FIELD

This disclosure relates generally to three-dimensional (3D) modeling, and more specifically, to determining and/or generating data for an architectural opening area associated with a captured 3D model.

BACKGROUND

Digital three-dimensional (3D) models can be generated based on scans of architectural spaces (e.g., houses, construction sites, office spaces, etc). In certain instances, a 3D model of an architectural space can be associated with one or more windows. However, data associated with windows of a 3D model (e.g., data obtained via a scan of an architectural space) often times does not accurately and/or adequately convey a view out the windows.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes an identification component, a spatial data component, a visual data component and a rendering component. The identification component identifies a portion of an image associated with a three-dimensional (3D) model that corresponds to a window view or another architectural opening area based at least in part on color data or depth data. The spatial data component determines a surface associated with the 3D model to render the window view or the other architectural opening area. The visual data component determines visual data for the window view or the other architectural opening area, and the rendering component applies the visual data for the window view or the other architectural opening area to the surface associated with the 3D model.

Additionally, a non-limiting implementation provides for identifying data of a three-dimensional (3D) model that corresponds to a view associated with an architectural opening area based at least in part on color data or depth data, determining a surface associated with the 3D model to render the view associated with the architectural opening area, determining texture data for the view associated with the architectural opening area, and applying the texture data for the view associated with the architectural opening area to the surface.

In accordance with another implementation, a computer readable storage device includes instructions that, in response to execution, cause a system that includes a processor to perform operations, including: identifying a portion of an image associated with a three-dimensional (3D) model that corresponds to a window view or another architectural opening area based on data related to pixels of the image, determining a surface associated with the 3D model to render the window view or the other architectural opening area, determining texture data for the window view or the other architectural opening area, and applying the texture data for the window view or the other architectural opening area to the surface associated with the 3D model.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects and implementations of the present innovation will be apparent upon consideration of the following detailed description, taken in conjunction with the accompanying drawings, in which like reference characters refer to like parts throughout, and in which.

DETAILED DESCRIPTION

Figure 1:
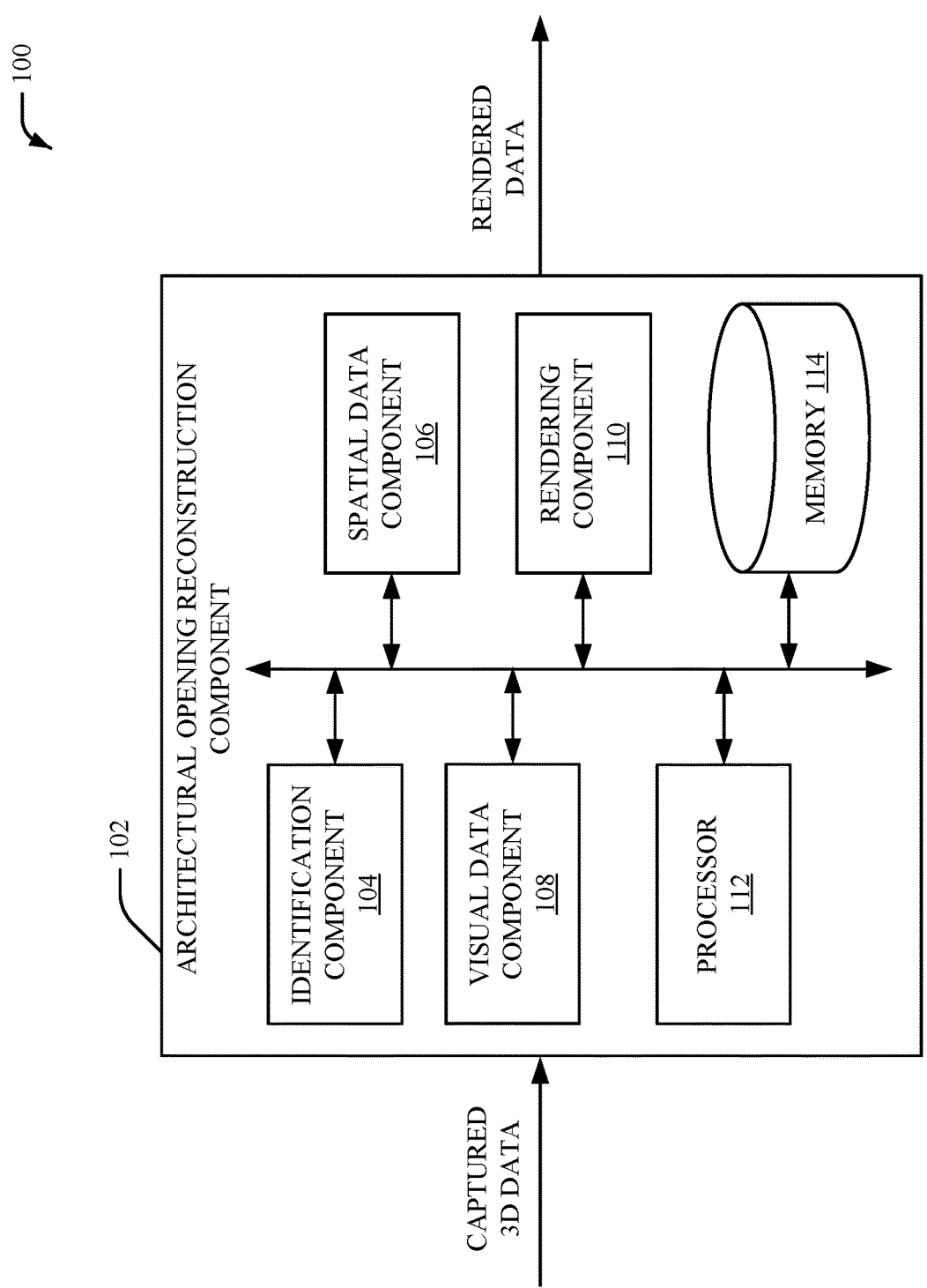
FIG. 1 illustrates a high-level block diagram of an example window component for determining and/or generating data for an opening area associated with a three-dimensional (3D) model, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Digital three-dimensional (3D) models can be generated based on scans of architectural spaces (e.g., houses, construction sites, office spaces, etc). In certain instances, a 3D model of an architectural space can be associated with one or more windows. However, data associated with an opening area (e.g., windows, doors, skylights, etc.) of a 3D model (e.g., data obtained via a scan of an architectural space) often times does not accurately and/or adequately convey a view out the opening area. For example, since windows are often transparent, image sensors and/or depth sensors often are not able to identify windows when scanning an architectural space. Furthermore, in a scenario where a window is dirty, 3D model data may incorrectly correlate a texture with the window.

To that end, techniques for determining and/or generating data (e.g., visual data) for an opening area associated with 3D data (e.g., 3D-reconstructed data) and/or a 3D model are presented. Determining and/or generating data for an opening area (e.g., a window, a door, a skylight, etc.) can be employed in connection with a 3D reconstruction system that can facilitate automatic and/or semi-automatic generation of 3D models of real-world locations (e.g., houses, apartments, construction sites, office spaces, commercial spaces, other living spaces, other working spaces, etc.). A 3D reconstruction system can employ two-dimensional (2D) image data and/or depth data captured from 3D sensors (e.g., laser scanners, structured light systems, time-of-flight systems, etc.) to generate the 3D data (e.g., the 3D-reconstructed data) and/or the 3D model. In an aspect, data for an opening area can be determined and/or generated based on the 2D image data and/or one or more other images (e.g., one or more other images associated with one or more third party data sources). In an embodiment, areas corresponding to views out an opening area can be identified in an image associated with 3D data (e.g., 3D-reconstructed data) and/or a 3D model. A surface or shape upon which to render the view out the opening area can then be determined. Then, one or more viewpoints can be determined as source data (e.g., visual appearance data, texture data, etc.) for the view out the opening area. The source data can be applied to the surface or the shape to represent and/or display the view out an opening area. Accordingly, one or more geometrically situated visual appearances for a view out an opening area associated with a 3D model can be simulated.

Referring initially to FIG. 1, there is illustrated a system 100 that can determine and/or generate data (e.g., visual data, texture data, etc.) for an opening area (e.g., a window, a door, a skylight, etc.) associated with a 3D model, according to an aspect of the subject disclosure. In one example, the system 100 can be implemented on or in connection with at least one server associated with 3D data (e.g., 3D-reconstructed data). The system 100 can be employed by various systems, such as, but not limited to 3D modeling systems, 3D reconstruction systems, server systems, cloud-based systems, client-side systems, and the like.

Specifically, the system 100 can provide an architectural opening reconstruction component 102 with an identification feature (e.g., identification component 104), a surface feature (e.g., spatial data component 106), a data feature (e.g., visual data component 108) and/or a rendering feature (e.g., rendering component 110) that can be utilized in, for example, a 3D modeling application (e.g., a 3D reconstruction application). The identification feature can identify a portion of an image associated with a 3D model that corresponds to an opening view (e.g., a window view, a door view, a skylight view, etc.) based on luminance data, color data and/or depth data. The surface feature can determine a surface associated with the 3D model to render the opening view. The data feature can determine visual data for the opening view. The rendering feature can apply the visual data for the opening view to the surface associated with the 3D model.

In particular, the system 100 can include architectural opening reconstruction component 102. In FIG. 1, the architectural opening reconstruction component 102 includes an identification component 104, a spatial data component 106, a visual data component 108 and/or a rendering component 110. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 114 for storing computer executable components and instructions. System 100 can further include a processor 112 to facilitate operation of the instructions (e.g., computer executable components and instructions) by system 100.

The architectural opening reconstruction component 102 (e.g., with the identification component 104) can receive captured 3D data (e.g., CAPTURED 3D DATA shown in FIG. 1). The captured 3D data can be captured 3D-reconstructed data. In one example, the captured 3D data can be raw 3D-reconstruced data. In another example, the captured 3D data can be processed and/or segmented 3D-reconstructed data. In an aspect, the captured 3D data can be generated (e.g., captured) via at least one 3D reconstruction system. For example, the at least one 3D reconstruction system can employ 2D image data and/or depth data captured from one or more 3D sensors (e.g., laser scanners, structured light systems, time-of-flight systems, etc.) to automatically and/or semi-automatically generate a 3D model of an interior environment (e.g., architectural spaces, architectural structures, physical objects, . . . ). In an aspect, the 3D model can additionally be associated with an exterior architectural environment related to the interior environment. In one embodiment, the one or more 3D sensors can be implemented on a camera to capture (e.g., simultaneously capture) texture data and geometric data associated with the interior environment and/or the exterior architectural environment. In another embodiment, the one or more 3D sensors can be implemented on a mobile device (e.g., a smartphone, etc.) to capture texture data and geometric data associated with the interior environment and/or the exterior architectural environment.

A 3D model of an interior environment (e.g., the captured 3D data) can comprise geometric data and/or texture data. The geometric data can comprise data points of geometry in addition to comprising texture coordinates associated with the data points of geometry (e.g., texture coordinates that indicate how to apply texture data to geometric data). For example, a 3D model of an interior environment and/or an exterior architectural environment (e.g., the captured 3D data) can comprise mesh data (e.g., a triangle mesh, a quad mesh, a parametric mesh, etc.), one or more texture-mapped meshes (e.g., one or more texture-mapped polygonal meshes, etc.), a point cloud, a set of point clouds, surfels and/or other data constructed by employing one or more 3D sensors. In one example, the captured 3D data can be configured in a triangle mesh format, a quad mesh format, a surfel format, a parameterized solid format, a geometric primitive format and/or another type of format. For example, each vertex of polygon in a texture-mapped mesh can include a UV coordinate for a point in a given texture (e.g., a 2D texture), where U and V are axes for the given texture. In a non-limiting example for a triangular mesh, each vertex of a triangle can include a UV coordinate for a point in a given texture. A triangle formed in the texture by the three points of the triangle (e.g., a set of three UV coordinates) can be mapped onto a mesh triangle for rendering purposes. In an aspect, the captured 3D data can be unsegmented captured 3D data. For example, the captured 3D data can be 3D data that is not partitioned after being captured by one or more 3D sensors (e.g., the at least one 3D reconstruction system).

In an aspect, 3D scene information (e.g., the captured 3D data) can be processed by a 3D scene alignment process that takes multiple 3D scenes captured from multiple points of view and produces an alignment of some or all of the 3D scenes into a common coordinate frame. In certain implementations, data from 3D sensors can be recorded with a timestamp and/or along with particular captures by a 3D capture device. When a particular 3D capture is aligned to other 3D captures, position of data from additional sensors captured at the same or very similar time can be determined by using an aligned position of the 3D capture device when the 3D capture device obtained the particular 3D capture. This data from additional sensors can be collected over time to create a 2D map or 3D map of additional sensor readings. In another aspect, information associated with plane objects can be employed during an alignment process. For example, multiple 3D scenes with plane objects that appear to match visually and/or have very similar positions and orientations can be appended together such that all of the similar plane objects become coplanar. Plane objects may be matched using 2D texture features such as a Scale-invariant feature transform (SIFT) or Speeded Up Robust Features (SURF), geometric descriptors such as known edges and corners, as well as position and orientation.

In yet another aspect, plane objects can be identified by multiple applications of RANdom SAmple Consensus (RANSAC) on 3D points in a scene which are not already assigned to a plane object. Optionally, for each plane object, 3D points along with color and any texture information from images projected onto a plane object can be employed to generate 2D texture features using SURF and SIFT methods. Boundaries and corners of an object can also be also detected. Some or all of these features can be added as information to the plane object. Plane objects within each scene can then be snapped to architectural angles such as multiples of 45 degrees. Furthermore, object planes can be merged between scenes or existing merged plane objects may be split. Methods such as RANSAC can be used to determine which plane objects should be merged into a single plane object or split apart. Combinatorial optimization techniques can also be applied, with terms based on goodness of fit of planes to be grouped together and/or terms based on the total number of groupings. Additionally, scene poses may be adjusted relative to each other to reduce adjustments needed for plane objects which have been merged with plane objects in other scenes. Plane objects can be snapped to global architectural angles based on a global coordinate system or a global plane object.

An interior environment (e.g., an indoor environment, an interior architectural environment, etc.) can include, but is not limited to, one or more rooms, one or more houses, one or more apartments, one or more office spaces, one or more construction sites, one or more commercial spaces, other living spaces, other working spaces, other environment spaces, interiors of buildings, vehicles, vessels, aircraft, subways, tunnels, crawl spaces, equipment areas, attics, cavities, etc. Furthermore, an interior environment can include physical objects included in one or more rooms, one or more houses, one or more apartments, one or more office spaces, one or more construction sites, one or more commercial spaces, other living spaces, other working spaces and/or other environment spaces. An exterior architectural environment related to an interior environment can include, but is not limited to, a patio, a deck, building frontage (e.g., building façade), outdoor architecture, one or more physical objects, one or more outdoor objects, etc.

The identification component 104 can identify one or more opening areas (e.g., architectural opening areas, architectural window areas, architectural door areas, architectural skylight areas, etc.) associated with 3D data (e.g., 3D-reconstructed data, captured 3D data, mesh data, etc.) and/or a 3D model. An opening area can comprise and/or be associated with an opening (e.g., a window opening, a door opening, a skylight, etc.) in a flat surface (e.g., a wall, a ceiling, etc.) of a 3D model (e.g., captured 3D data). In one example, an opening area can comprise and/or be associated with an opening in a particular flat plane (e.g., a wall) that connects a subsection (e.g., a room) of a 3D model to an area outside captured 3D data and/or the subsection (e.g., the room). An area outside captured 3D data can be associated with, for example, an outdoor area. In another example, an opening area can be an opening in a particular flat plane (e.g., a wall) that connects two subsections (e.g., two rooms) of a 3D model. A flat surface can be characterized by a 2D region on a plane associated with captured 3D data. The identification component 104 can identify a flat surface associated with captured 3D data by identifying a plane within a mesh (e.g., mesh data). In an aspect, the identification component 104 can identify flat surfaces in captured 3D data based on an iterative method such as, for example, RANSAC. For example, the identification component 104 can select a certain surface area and/or a certain number of edges, vertices, or triangles that are associated with a common plane in captured 3D data. Planes that comprise a particular size (e.g., surface area, height, width, etc.) and/or a particular angle (e.g., an angle corresponding to walls or ceilings) can be identified as a flat surface. Additionally or alternatively, the identification component 104 can identify flat surfaces in captured 3D data based on a non-iterative method.

The identification component 104 can employ predetermined information associated with an architectural opening (e.g., a window, a skylight, a door, etc.) to identify an opening area. In an aspect, the identification component 104 can employ predetermined information associated with a window to identify a window area. For example, the identification component 104 can identify an architectural opening of a flat surface as a window area by employing predetermined information associated with a window. A window area generally comprises a height within a certain range (e.g., a height that is less than a door height) and/or generally comprises a lower boundary (e.g., a bottom boundary) that is above (e.g., significantly above) a height of a nearest flat plane associated with a floor. As such, the identification component 104 can identify an architectural opening of a flat surface as a window area in response to a determination that a height of the architectural opening is less than a threshold level (e.g., a certain height that is less than a door opening, etc.) and/or based on particular boundary data associated with the architectural opening. Similarly, the identification component 104 can employ predetermined information associated with a skylight to identify a skylight area. For example, the identification component 104 can identify an architectural opening of a flat surface as a skylight area by employing predetermined information associated with a skylight (e.g., a skylight area is generally located on a flat plane associated with a ceiling, etc.). Additionally or alternatively, the identification component 104 can employ predetermined information associated with a door to identify a door area. For example, the identification component 104 can identify an architectural opening of a flat surface as a door area by employing predetermined information associated with a door. A door area generally comprises a height within a certain range (e.g., a height that is greater than a window height) and/or generally comprises a lower boundary (e.g., a bottom boundary) that corresponds to flat plane associated with a floor. As such, the identification component 104 can identify an architectural opening of a flat surface as a door area in response to a determination that a height of the architectural opening is greater than a threshold level (e.g., a certain height that is greater than a window opening, etc.) and/or based on particular boundary data associated with the architectural opening.

A window area also generally comprises, for example, a rectangular shape corresponding to a location where the window area penetrates a flat surface (e.g., a wall). Similarly, a door area also generally comprises, for example, a rectangular shape corresponding to a location where the door area penetrates a flat surface (e.g., a wall). A skylight area generally comprises, for example, a rectangular shape corresponding to a location where the skylight area penetrates another type of flat surface (e.g., a ceiling). Therefore, the identification component 104 can additionally or alternatively identify an architectural opening of a flat surface as an opening area (e.g., a window area, a skylight area or a door area) in response to a determination that a shape of the architectural opening corresponds to a shape included in a set of shapes (e.g., as set of predetermined shapes). Moreover, an opening area generally comprises a particular depth to which the opening area penetrates a flat surface (e.g., a wall or a ceiling) and/or is generally surrounded by a flat surface associated with a wall or a ceiling. In one example, a surface of a flat surface associated a wall can comprise a window area or a door area. In another example, a window area can be separate from a surface of a flat surface associated a wall. Thus, the identification component 104 can additionally or alternatively identify an architectural opening of a flat surface as an opening area (e.g., a window area, a skylight area or a door area) based on data associated with the flat surface. In an aspect, a window area associated with closed blinds can be identified based on predetermined textures and/or shapes of blinds or curtains.

With regard to a window area, the identification component 104 can identify a portion of a window area (e.g., a portion of an image associated with a window area) that corresponds to a window view. A window view can be a view out of a window associated with (e.g., included in) a 3D model. For example, a window view can be an outdoor view conveyed through a window associated with a 3D model. A portion of a window area that does not correspond to a window view can be an architectural window element (e.g., a window frame, a wall surround a window, etc.).

The identification component 104 can identify a portion of an image (e.g., a portion of an image associated with a window area of a 3D model) that corresponds to a window view based on data associated with pixels of the image. For example, the identification component 104 can analyze pixels of the image and/or data associated with pixels of the image to determine a portion of the image that corresponds to a window view. Therefore, the identification component 104 can determine one or more portions of the image that are associated with window view pixels (e.g., pixels related to a view out a window) and one or more other portions of the image that are not associated with window view pixels (e.g., pixels related to architectural window elements, etc.). Additionally or alternatively, the identification component 104 can identify a portion of an image that corresponds to a skylight view and/or a door view based on data associated with pixels of the image. For example, the identification component 104 can analyze pixels of the image and/or data associated with pixels of the image to determine a portion of the image that corresponds to a skylight view and/or a door view. Therefore, the identification component 104 can determine one or more portions of the image that are associated with skylight view pixels (and/or door view pixels) and one or more other portions of the image that are not associated with skylight view pixels (and/or door view pixels).

During daytime hours, portion(s) of an image (e.g., portion(s) of an image associated with a window area of a 3D model) associated with a window view are generally much brighter than other portion(s) of the image that are not associated with a window view. Furthermore, during nighttime hours, portion(s) of an image (e.g., portion(s) of an image associated with a window area of a 3D model) associated with a window view are generally much darker than other portion(s) of the image that are not associated with a window view. As such, in an aspect, the identification component 104 can identify a portion of an image (e.g., a portion of an image associated with a window area of a 3D model) that corresponds to a window view based on luminance data (e.g., brightness data) associated with pixels of the image. The identification component 104 can analyze and/or compare luminance data associated with pixels of the image to determine a set of pixels that comprise greater brightness (e.g., a certain degree of greater brightness) with respect to other pixels in the image. The set of pixels that comprise luminance data associated with greater brightness can be identified as a portion of the image that corresponds to a window view. Alternatively, the identification component 104 can analyze and/or compare luminance data associated with pixels of the image to determine a set of pixels that comprise greater darkness (e.g., a certain degree of greater darkness) with respect to other pixels in the image. The set of pixels that comprise luminance data associated with the greater darkness can be identified as a portion of the image that corresponds to a window view (e.g., during nighttime hours) or can be identified as a portion of the image that does not correspond to a window view (e.g., during daytime hours).

In one example, the identification component 104 can determine and/or calculate an absolute luminance value for an image. Furthermore, the identification component 104 can determine one or more regions of the image (e.g., pixels of the image) that are greater than a threshold value associated with the absolute luminance value (e.g., a threshold value that is greater than the absolute luminance value by a certain degree). Sufficiently bright regions of an image with respect to absolute luminance can be associated with a window view (e.g., an outdoor view, etc.). In another example, the identification component 104 can compare relative luminance of pixels to average luminance of pixels to identify a portion of an image (e.g., associated with a 3D model) that corresponds to a window view. For example, if the identification component 104 determines that a majority of an image (e.g., a certain percentage of the image) is an outside view (e.g., a window view), then the identification component 104 can determine that darker pixels near an edge of a region are likely to be window pixels (e.g., during daytime hours). Similarly, the identification component 104 can identify a portion of an image that corresponds to a skylight view and/or a door view based on luminance data (e.g., brightness data) associated with pixels of the image.

Additionally or alternatively, the identification component 104 can identify a portion of an image (e.g., a portion of an image associated with a window area of a 3D model) that corresponds to a window view based on color data (e.g., color differences, color boundaries, etc.) associated with pixels of the image. For example, the identification component 104 can employ color data to differentiate between pixels associated with an architectural window element (e.g., a window frame) and pixels associated with a window view. The identification component 104 can analyze and/or compare color data associated with pixels of the image to determine a set of pixels that comprise a different color than other pixels of the image (e.g., a unique color with respect to other pixels of the image). In one example, the identification component 104 can identify a color boundary to distinguish between pixels associated with architectural window elements and other pixels associated with a window view. Similarly, the identification component 104 can identify a portion of an image that corresponds to a skylight view and/or a door view based on color data (e.g., color differences, color boundaries, etc.) associated with pixels of the image. In one example, the identification component 104 can employ color data to differentiate between pixels associated with an architectural door element and pixels associated with a flat surface (e.g., a wall) that includes the architectural door element.

Additionally or alternatively, the identification component 104 can identify a portion of an image (e.g., a portion of an image associated with a window area of a 3D model) that corresponds to a window view based on depth data (e.g., an amount of depth information, lack of depth information, etc.) associated with pixels of the image. For example, the identification component 104 can employ depth data to differentiate between pixels associated with an architectural window element (e.g., a window frame) and pixels associated with a window view. Depth data can be captured from one or more 3D sensors and/or one or more depth sensors associated with a camera and/or a mobile device when scanning an architectural space. Architectural window elements scanned with the one or more 3D sensors and/or the one or more depth sensors will comprise depth information, while objects through windows will either comprise much greater depth information or comprise no depth information. In one example, lack of depth information at a pixel location can indicate that the pixel location is associated with a window view. The identification component 104 can determine that pixels that are not associated with depth information correspond to a window view. In another example, presence of large depth information (e.g., distant depth) can indicate that the pixel location is associated with a window view. Accordingly, the identification component 104 can additionally or alternatively determine that pixels associated with a particular level of depth information (e.g., a high level of depth information, large depth, etc.) correspond to a window view. Similarly, the identification component 104 can identify a portion of an image that corresponds to a skylight view and/or a door view based on depth data (e.g., an amount of depth information, lack of depth information, etc.) associated with pixels of the image.

Therefore, the identification component 104 can employ luminance data (e.g., brightness data), color data and/or depth data to identify a portion of an image associated with a 3D model that corresponds to a window view, a skylight view and/or a door view (e.g., to determine portions of an image associated with a window view and other portions of the image that are not associated with a window view, to determine portions of an image associated with a skylight view and other portions of the image that are not associated with a skylight view, to determine portions of an image associated with a door view and other portions of the image that are not associated with a door view, etc.). However, it is to be appreciated that the identification component 104 can additionally or alternatively employ other data (e.g., transparency data, texture data, timestamp data, other data, etc.) to identify a portion of an image associated with a 3D model that corresponds to a window view, a skylight view and/or a door view.

The spatial data component 106 can determine a surface associated with the 3D model to render the window view, the skylight view and/or the door view. For example, the spatial data component 106 can determine a surface to be added to the 3D model to render the window view, the skylight view and/or the door view. In an embodiment, the surface can be a surface of a flat plane. The flat plane can be associated with an opening area (e.g., a window area, a skylight area and/or a door area). For example, the flat plane can correspond to a plane associated with an opening area (e.g., window area, a skylight area and/or a door area). Alternatively, a certain distance can be implemented between the flat plane and an opening area (e.g., window area, a skylight area and/or a door area). In an aspect, the spatial data component 106 can determine a surface included in a 3D model (e.g., a flat plane that includes a flat surface) to render the window view, the skylight view and/or the door view. In another aspect, the spatial data component 106 can generate a surface (e.g., a flat plane that includes a flat surface) and/or append the surface (e.g., the generated surface) to the 3D model. In an embodiment, the surface can be a surface of a non-flat plane. For example, the surface can be a surface of a curved 3D shape.

In another embodiment, the surface can be associated with a skybox and/or a 3D shape. A skybox can be associated with a projection of an image. For example, a skybox can portray an infinitely distant environment. In one example, a skybox can be associated with a 360 degree environment. A shape of a skybox can include, but is not limited to, a cube shape, a rectangular prism, a trapezoidal prism, a sphere, a different shape, etc. Thus, the surface to render the window view, the skylight view and/or the door view can be a surface of a skybox. A 3D shape can be a shape that portrays a finite distant environment. A 3D shape can include, but is not limited to, a cube shape, a rectangular prism, a trapezoidal prism, a sphere, a different shape, etc. Thus, the surface to render the window view, the skylight view and/or the door view can additionally or alternatively be a surface of a shape (e.g., a 3D shape). In an aspect, a 3D shape can be at least partially constructed based on depth data and/or photogrammetric data (e.g., a set of images associated with a real-world scene). For example, depth data and/or photogrammetric data can be employed (e.g., by the spatial data component 106) to choose a distance of a window view, a skylight view and/or a door view. In another example, depth data and/or photogrammetric data can be employed (e.g., by the spatial data component 106) to determine whether to employ a skybox or not. In yet another example, depth data and/or photogrammetric data can be employed to determine whether to add a ground plane or not. In another aspect, the spatial data component 106 can compute additional spatial data associated with an architectural opening and/or a window view based on photogrammetric analysis of image data (e.g., image data viewed through a surface).

The visual data component 108 can determine visual data (e.g., texture data and/or color data) for the window view, the skylight view and/or the door view. Visual data can be visual appearance data (e.g., visual appearance information) to facilitate generation of the window view, the skylight view and/or the door view. In an embodiment, the visual data component 108 can determine visual data for the window view, the skylight view and/or the door view based on an image or a set of images. In an aspect, the visual data component 108 can determine the visual data for the window view, the skylight view and/or the door view based on an image or a set of images (e.g., 2D image data) generated via a model capture process employed to capture 3D data (e.g., via a 3D reconstruction system). For example, the visual data component 108 can determine the visual data for the window view, the skylight view and/or the door view based on one or more images (e.g., one or more color images) captured from one or more 3D sensors and/or one or more 2D sensors associated with a camera (e.g., a handheld camera, a tripod mounted camera, etc.) and/or a mobile device (e.g., a smartphone, a handheld 3D sensor, etc.). The visual data component 108 can employ an alignment process to determine a capture point of the one or more images captured by the camera and/or the mobile device.

In another aspect, the visual data component 108 can determine the visual data for the window view, the skylight view and/or the door view based on one or more third party sources (e.g., one or more third party data sources). For example, the visual data component 108 can determine geographic coordinates (e.g., global positioning system coordinates, etc.) associated with an opening area (e.g., a window area, a skylight area, a door area, etc.) and/or a 3D model associated with the opening area (e.g., the window area, the skylight area, the door area, etc.). The geographic coordinates can be associated with captured 3D data. Alternatively, the geographic coordinates can be manually entered (e.g., by a user). As such, the visual data component 108 can receive visual data from one or more third party sources based on the geographic coordinates. In one example, a third party source can be associated with a geographic model (e.g., a model of the earth). In another example, a third party source can be associated with images related to a web mapping service application (e.g., location-based images, street map images, street view perspectives, panoramic images, satellite imagery, etc.). In yet another example, a third party source can be associated with one or more geo-tagged image databases.

Additionally or alternatively, the visual data component 108 can determine visual data for the window view, the skylight view and/or the door view based on other captured 3D data. For example, the visual data component 108 can determine and/or infer visual data for the window view, the skylight view and/or the door view based on other texture data associated with captured 3D data and/or a 3D model.

The rendering component 110 can apply the visual data for a view to a surface associated with an architectural opening (e.g., a window, a skylight, a door, etc.). In an aspect, the rendering component 110 can apply the visual data for a window view to a surface associated with a window opening (e.g., the surface determined by the spatial data component 106). For example, the rendering component 110 can apply the visual data to a plane corresponding to a window associated with the window view. In another example, the rendering component 110 can apply the visual data to a plane parallel to a window associated with the window view. In yet another example, the rendering component 110 can apply the visual data to a surface of a 3D shape and/or a surface of a skybox associated with the 3D model (e.g., a single skybox associated with the 3D model, a skybox for a window of the 3D model that is associated with the window view, etc.). In another aspect, the rendering component 110 can apply the visual data for a skylight view to a surface associated with a skylight opening. For example, the rendering component 110 can apply the visual data to a plane corresponding to a skylight associated with the skylight view. In another example, the rendering component 110 can apply the visual data to a plane parallel to a skylight associated with the skylight view. In yet another aspect, the rendering component 110 can apply the visual data for a door view to a surface associated with a door opening. For example, the rendering component 110 can apply the visual data to a plane corresponding to a door associated with the door view. In another example, the rendering component 110 can apply the visual data to a plane parallel to a door associated with the door view. The visual data applied to the surface by the rendering component 110 can be rendered data (e.g., RENDERED DATA shown in FIG. 1) for the window view, the skylight view and/or the door view. For example, the rendered data generated by the rendering component 110 can be presented to a user (e.g., via a client device).

In an aspect, the rendering component 110 can project a texture associated with the visual data onto the surface by projecting selected section(s) of a particular image onto the surface from a capture position at which the particular image was captured. The rendering component 110 can determine a particular texture for a projection based on which projected texture covers a greatest area of the surface. In one example, a surface can be textured via the rendering component 110 by employing sections of images of windows which are identified as background visual data. In another example, the rendering component 110 can project visual data (e.g., one or more images) onto the surface and/or merge visual data (e.g., merge a plurality of images) via one or more 2D image stitching techniques. Additionally, the rendering component 110 can merge textures from multiple images (e.g., multiple points of view) to create a single wide-angle image (e.g., a single wide-angle view out a window, a panorama view out a window, etc.). The rendering component 110 can apply visual data associated with the single wide-angle image to the surface. The rendering component 110 can select a particular projected texture from the multiple images as a color data source (e.g., a source from which to obtain color data) for a pixel associated with the surface. In an aspect, textures associated with the multiple images can be ordered (e.g., ranked) by the rendering component 110 based on size of a texture with respect to area of a surface (e.g., an amount of area of the surface that is covered by a texture, etc.). As such, a texture that adequately covers a surface can be ranked higher. A particular texture (e.g., a highest ranked texture) that comprises color data for a corresponding pixel of the surface can be employed as a color data source for the corresponding pixel of the surface. In one example, one or more graph cut algorithms can be employed to merge textures from multiple images.

In another aspect, the rendering component 110 can modify the visual data for the window view, the skylight view and/or the door view based on position data associated with a rendering of the 3D model on the remote client device. Additionally or alternatively, the rendering component 110 can determine visual data for the window view, the skylight view and/or the door view based on a set of visual effects (e.g., a set of after-effects). For example, visual data for a window view and/or a skylight view can be semi-transparent. In another example, visual data for a window view and/or a skylight view can be color tinted, frosted, etc. to suggest that the window view and/or the skylight view is associated with glass (e.g., that an area within a window frame comprises glass, etc.).

In an embodiment, the rendering component 110 can modify visual data for a window view (e.g., texture selected for a window view) at render time (e.g., when a 3D model is rendered). The rendering component 110 can modify visual data for a window view based on position data and/or orientation data associated with a rendering of a 3D model on a remote client device (e.g., a remote client device configured for receiving and/or displaying a 3D model via a 3D model viewer). In one example, the visual data component 108 can determine at least first visual data and second visual data (e.g., two or more textures) for a window view. The rendering component 110 can select particular visual data from a set of visual data determined by the visual data component 108 based on position data and/or orientation data (e.g., a viewpoint associated with a rendering of the 3D model on a remote client device). The rendering component 110 can, for example, select visual data for a viewpoint from other visual data associated with an image in close proximity to the viewpoint. For example, for a particular viewpoint, visual data from an image closest to the particular viewpoint can be preferentially chosen to be rendered for the opening view (e.g., the window view, the skylight view, the door view, etc.). In one example, as position data and/or orientation data is updated (e.g., as a viewpoint associated with a rendering of the 3D model on a remote client device is altered), visual data (e.g., texture) for a window view can fade or transition from the visual data to other visual data.

In another aspect, visual data for a window can be modified based on position data and/or orientation data associated with a rendering of a 3D model on a remote client device (e.g., based on proximity of a viewpoint associated with a 3D model viewer to the window). For example, visual data for a window view that is applied to a surface can be zoomed-out or zoomed-in (e.g., expanded, cropped, etc.) via the rendering component 110 based on position data and/or orientation data (e.g., based on proximity of a viewpoint associated with a 3D model viewer to the window). In yet another aspect, visual data for a window can be modified based on luminance data associated with a 3D model and/or time of day associated with a 3D model. For example, brightness of visual data for a window can be modified based on luminance data associated with a rendering of a 3D model on a remote client device (e.g., a window view can portray a daytime view in response to a determination that a rendering of a 3D model on a remote client device is in a daytime mode, etc.). In yet another aspect, visual data for a window can be determined and/or modified based on other visual data associated with another window (e.g., an adjacent window). For instance, visual data for a particular window can be continuous with respect to other visual data for another window (e.g., a window view for adjacent windows can be associated with different portions of an image or a set of images). In yet another aspect, visual data for a window can be determined and/or modified based on height data and/or floor level data associated with the window. For example, the rendering component 110 can determine which portion of an image or a set of images to apply to a surface for a window view based on height data and/or floor level data (e.g., visual data for a window view related to a second floor can correspond to an upper portion of an image or a set of images portraying an approximate second floor view).

While FIG. 1 depicts separate components in system 100, it is to be appreciated that the components may be implemented in a common component. In one particular implementation, the identification component 104, the spatial data component 106, the visual data component 108 and/or the rendering component 110 can be included in a single component. Further, it can be appreciated that the design of system 100 can include other component selections, component placements, etc., to facilitate determining and/or generating data for a window area associated with a 3D model.

Figure 2:
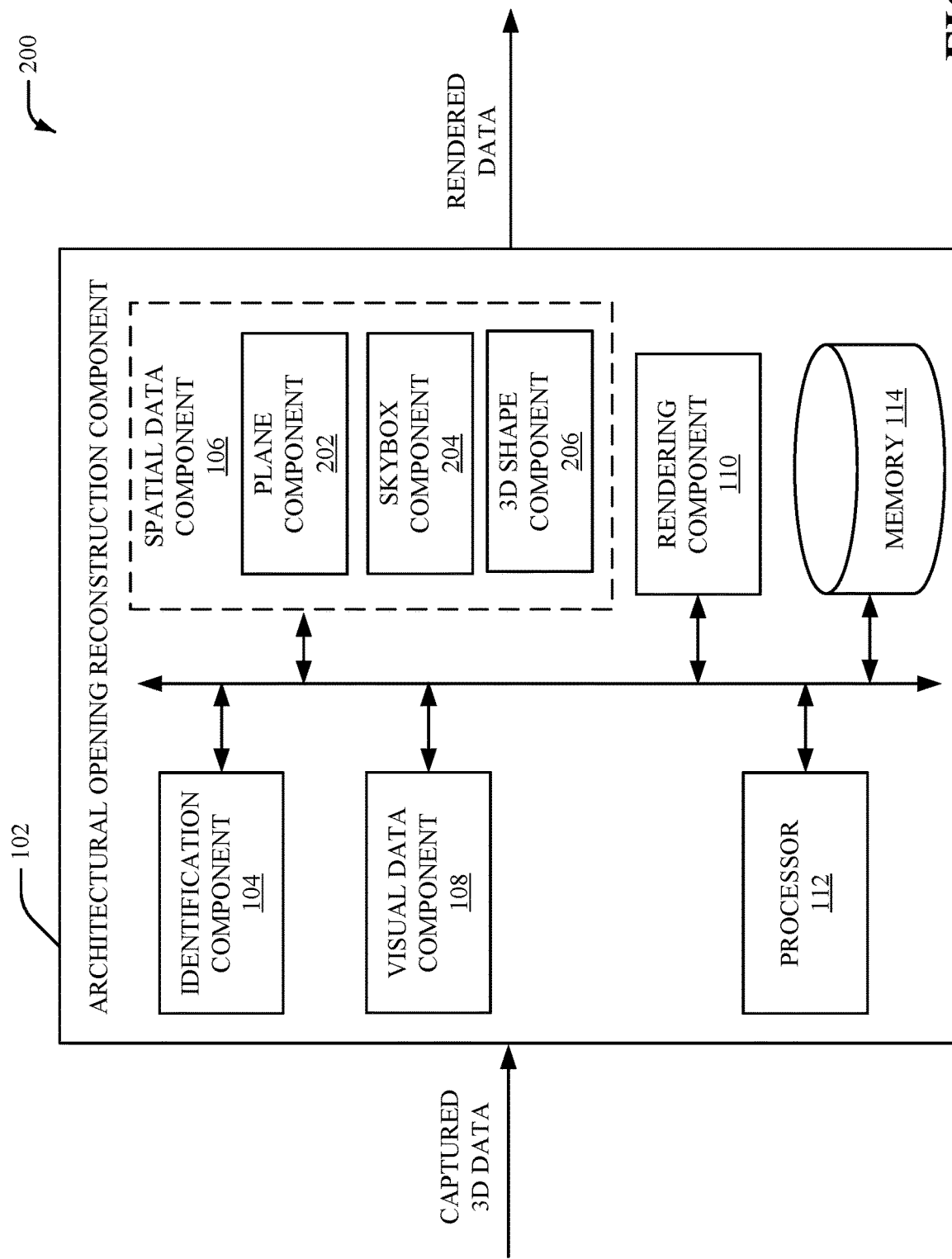
FIG. 2 illustrates a high-level block diagram of another example window component for determining and/or generating data for an opening area associated with a 3D model, in accordance with various aspects and implementations described herein.

Referring to FIG. 2, there is illustrated a non-limiting implementation of a system 200 in accordance with various aspects and implementations of this disclosure. The system 200 includes the identification component 104, the spatial data component 106, the visual data component 108 and/or the rendering component 110. The spatial data component 106 can include a plane component 202, a skybox component 204 and/or a 3D shape component 206.

The plane component 202 can determine a plane (e.g., a flat plane) included in a 3D model (e.g., captured 3D data). The plane can comprise a surface (e.g., a flat surface) to render a window view, a skylight view and/or a door view. For example, the plane component 202 can identify a plane corresponding to a window of the 3D model that is associated with the window view. In another example, the plane component 202 can identify a plane corresponding to a skylight of the 3D model that is associated with the skylight view. In yet another example, the plane component 202 can identify a plane corresponding to a door of the 3D model that is associated with the door view. Alternatively, the plane component 202 can generate a plane (e.g., a flat plane) and/or append the plane to a 3D model generated based on 3D captured data. For example, the plane component 202 can generate a plane corresponding to a window of the 3D model that is associated with the window view. In another example, the plane component 202 can generate a plane corresponding to a skylight of the 3D model that is associated with the skylight view. In yet another example, the plane component 202 can generate a plane corresponding to a door of the 3D model that is associated with the door view. The plane can be appended to a wall plane that includes the window and/or the door. The plane can alternatively be appended to a ceiling plane that includes the skylight. Furthermore, the plane generated by the plane component 202 can correspond to at least an area of the window, the skylight and/or the door (e.g., the plane generated by the plane component 202 can encompass at least an area corresponding to the window, the skylight and/or the door). In an aspect, the plane component 202 can align the plane with the window, the skylight and/or the door so that the plane completely encompasses a view out the window, the skylight and/or the door. In another example, the plane component 202 can generate a plane parallel to a window, a skylight and/or a door of the 3D model that is associated with the window view, the skylight view and/or the door view. A particular distance can be between the plane generated by the plane component 202 and a wall plane that includes the window, the skylight and/or the door.

The skybox component 204 can generate a skybox to render a window view, a skylight view and/or a door view. A skybox generated by the skybox component 204 can be associated with an infinite projection of at least one image (e.g., at least one texture image). For example, a projection of at least one image can be rendered for an infinite distance with respect to a 3D model. In one example, a skybox generated by the skybox component 204 can be associated with a 360 degree environment. A shape of a skybox generated by the skybox component 204 can include, but is not limited to, a cube shape, a rectangular prism, a trapezoidal prism, a sphere, a different shape, etc.

In an aspect, the skybox component 204 can generate a single skybox for a 3D model. For example, a single skybox can be constructed around an entire 3D model. Visual data can be applied to a single skybox generated by the skybox component 204 (e.g., a single skybox associated with the 3D model). In another aspect, the skybox component 204 can generate a skybox associated with one or more windows (e.g., associated with a window and/or a plane that includes a window). The skybox component 204 can generate a single skybox for each window associated with a 3D model (e.g., a skybox for each window of the 3D model that is associated with a window view). For example, a skybox can be generated behind each window in a 3D model with an open side of a skybox facing a window and/or converging with edges of a window. Alternatively, the skybox component 204 can generate a single skybox for two or more windows associated with a 3D model.

In an embodiment, the skybox component 204 can generate and/or render 3D information (e.g., 3D objects) within a certain range of an architectural opening and/or inside a volume of a skybox. For example, an outdoor architectural structure (e.g., a balcony, a deck, a patio, etc.) that is located next to a window associated with a skybox can be rendered as a 3D object within the skybox. In another implementation, the rendering component 110 can choose between employing a surface generated by the plane component 202 and a surface generated by the skybox component 204 to render a window view, a skylight view and/or a door view. The rendering component 110 can determine whether to employ a surface generated by the plane component 202 or a surface generated by the skybox component 204 based on position data and/or orientation data associated with a rendering of a 3D model on a remote client device (e.g., a remote client device configured for receiving and/or displaying a 3D model via a 3D model viewer). In one example, a plane corresponding to a window of the 3D model can be added to a window and/or a skybox to convey a window view for a window area based on a particular position data and/or particular orientation data associated with a rendering of a 3D model on a remote client device. In another implementation, a plane corresponding to a window of the 3D model can be removed and/or a skybox can be added to convey a window view for a window area based on a particular position data and/or particular orientation data associated with a rendering of a 3D model on a remote client device.

The 3D shape component 206 can generate a 3D shape to render a window view, a skylight view and/or a door view. A 3D shape generated by the 3D shape component 206 can be a 3D shape that includes at least one surface to render a window view, a skylight view and/or a door view. For example, a 3D shape generated by the 3D shape component 206 can be a 3D shape that includes at least one plane comprising a surface (e.g., a flat surface) to render a window view, a skylight view and/or a door view. A 3D shape generated by the 3D shape component 206 can be associated with a finite projection of at least one image (e.g., at least one texture image). For example, a projection of at least one image can be rendered for a finite distance with respect to a 3D model. A 3D shape generated by the 3D shape component 206 can be a 3D shape that includes at least one non-flat surface to render a window view, a skylight view and/or a door view. In one example, a 3D shape can be constructed behind two or more windows in a 3D model with an open side of a 3D shape facing two or more windows and/or converging with edges of two or more windows.

While FIG. 2 depicts separate components in system 200, it is to be appreciated that the components may be implemented in a common component. In one example, the plane component 202, the skybox component 204 and/or the 3D shape component 206 can be included in a single component. Further, it can be appreciated that the design of system 200 can include other component selections, component placements, etc., to facilitate determining and/or generating data for a window area associated with a 3D model.

Figure 3:
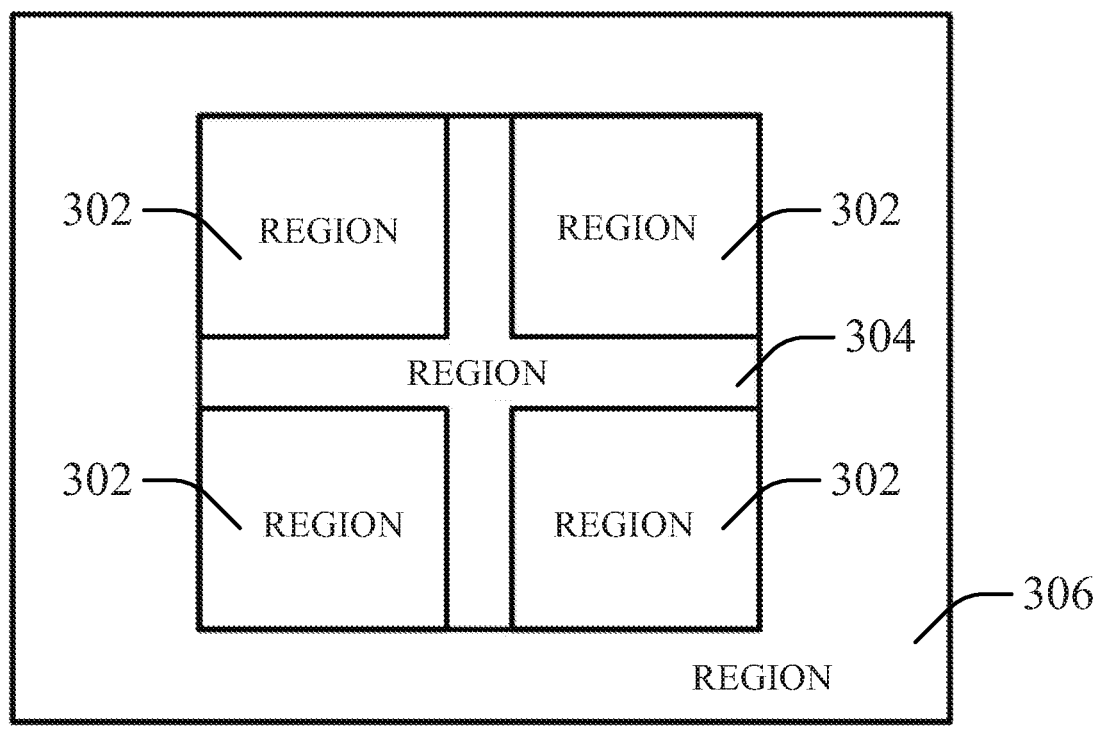
FIG. 3 illustrates an example flat plane comprising an opening area, in accordance with various aspects and implementations described herein.

Referring to FIG. 3, there is illustrated a non-limiting implementation of a flat plane 300 in accordance with various aspects and implementations of this disclosure. The flat plane 300 includes regions 302, a region 304 and a region 306. The flat plane 300 can be a flat surface of a 3D model (e.g., 3D captured data) that is associated with a window area.

Regions 302 can correspond to an area of the flat plane 300 that is associated with a window view (e.g., a view out a window). For example, regions 302 can be associated with an outdoor view and/or a 2D view. Regions 302 can correspond to an area of the flat plane 300 that is associated with glass of a window. Region 304 can correspond to an area of the flat plane 300 that is associated with an architectural window element (e.g., a frame of a window). In one particular implementation, a window area can correspond to regions 302 and region 304 (e.g., region 306 can be an area of the flat plane 300 that is associated with a wall). In another example, a window area can correspond to regions 302, region 304 and region 306 (e.g., region 306 can be an area of the flat plane 300 that is associated with a frame of a window).

In an aspect, the identification component 104 can determine (e.g., identify) the regions 302, the region 304 and/or the region 306 based on luminance data. For example, the identification component 104 can determine variance (e.g., a degree of variance) of luminance data in the flat plane 300 to facilitate identifying the regions 302, the region 304 and/or the region 306. Additionally or alternatively, the identification component 104 can determine (e.g., identify) the regions 302, the region 304 and/or the region 306 based on color data. The identification component 104 can determine difference of color data in the flat plane 300 to facilitate identifying the regions 302, the region 304 and/or the region 306. Additionally or alternatively, the identification component 104 can determine (e.g., identify) the regions 302, the region 304 and/or the region 306 based on depth data. The identification component 104 can determine difference of depth data in the flat plane 300 to facilitate identifying the regions 302, the region 304 and/or the region 306. Regions 302 can be associated with no depth data or a large amount of depth data with respect to the region 304 and/or region 306. The identification component 104 can determine which regions of the flat plane 300 represent a view through a window (e.g., regions 302) and which regions of the flat plane 300 represent an architectural window element and/or a wall (e.g., region 304 and region 306).

In an embodiment, the flat plane 300 can be associated with an image that is processed by the architectural opening reconstruction component 102. As such, the regions 302, the region 304 and/or the region 306 can be identified by the identification component 104 based on pixels associated with the regions 302, the region 304 and/or the region 306. For example, the identification component 104 can identify pixels associated with a window frame, pixels associated with a wall and/or pixels associated with a view through a window by analyzing data (e.g., luminance data, color data and/or depth data) associated with pixels of the flat plane 300. In an aspect, the identification component 104 can identify pixels associated with a view through a window (e.g., the regions 302) based on a masking operation. A window view can correspond to an area associated with regions 302 and region 304. If a window comprises window objects (e.g., stiles, rails, etc.) across the middle of the window, then a portion of an image representing a view out of the window will comprise regions of missing data which are occluded by the window objects. Thus, the visual data component 108 and/or the rendering component 110 can determine and/or generate visual data for regions of missing data (e.g., missing regions associated with a window view). In one example, the visual data component 108 and/or the rendering component 110 can determine and/or generate visual data for a region of missing data (e.g., region 304) by blending surrounding texture (e.g., averaging nearby textures).

In certain implementations, the identification component 104 can employ one or more machine learning techniques (e.g., to identify window boundaries, to identify skylight boundaries, to identify door boundaries, etc.). In one example, the identification component 104 can employ a training data set of window frames and/or the identification component 104 can categorize data as a part of a window frame or a view out a window. In another example, the identification component 104 can employ a training data set of skylight frames and/or the identification component 104 can categorize data as a part of a skylight frame or a view out a skylight. In yet another example, the identification component 104 can employ a training data set of door frames and/or the identification component 104 can categorize data as a part of a door frame or a view out a door. Inference associated with the identification component 104 can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with the identification component 104 and/or in connection with the claimed subject matter. In an aspect, a classifier can map an input attribute vector, x=(x1, x2, x3, x4, xn), to a confidence that the input belongs to a class, such as by f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 4:
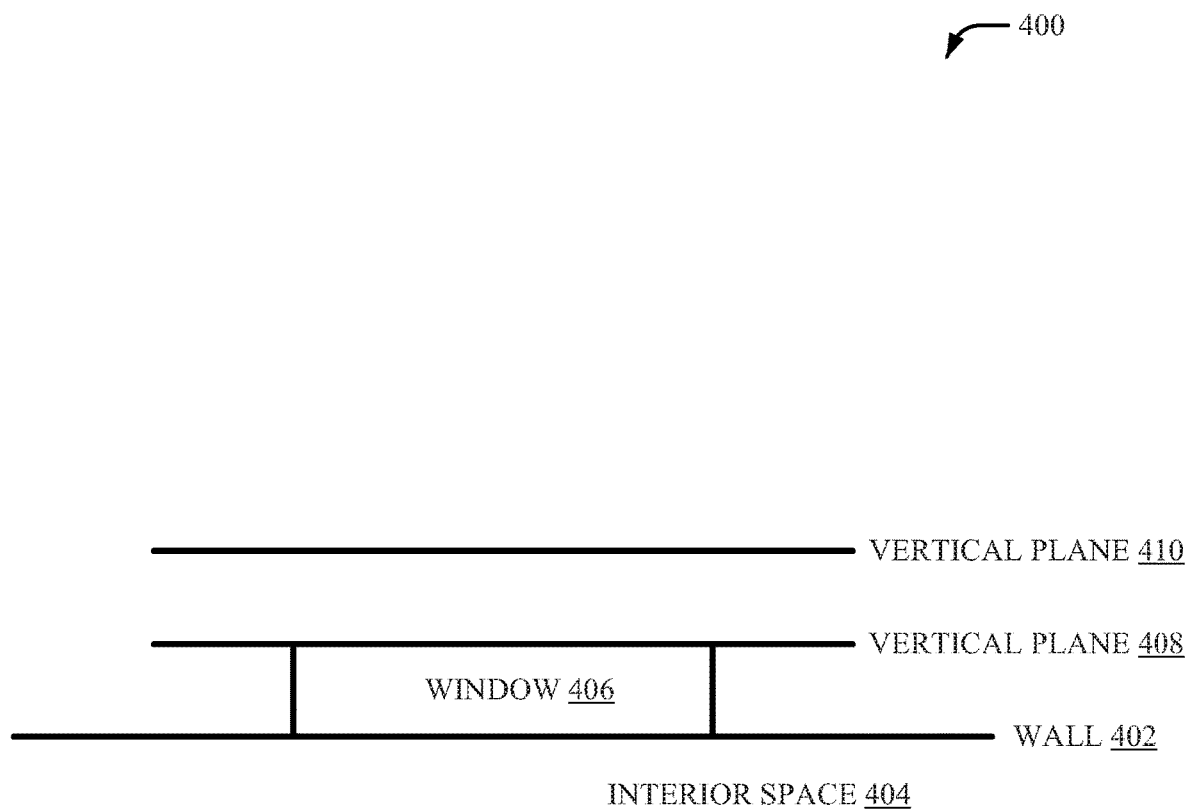
FIG. 4 illustrates a top-down view that includes example surfaces for rendering a window view, in accordance with various aspects and implementations described herein.

Referring to FIG. 4, there is illustrated a non-limiting implementation of a top-down view 400 in accordance with various aspects and implementations of this disclosure. The top-down view 400 includes a wall 402, an interior space 404, a window 406, a vertical plane 408 and a vertical plane 410. The vertical plane 408 and the vertical plane 410 can be a plane (e.g., a flat plane) comprising a flat surface. In FIG. 4, the wall 402 can be at an edge of the interior space 404. The wall 402 can comprise the window 406. In one example, visual data for a window view associated with the window 406 can be applied to the vertical plane 408 via the rendering component 110. For example, visual data can be applied at an outside edge of the window 406 via the vertical plane 408. In another example, visual data for a window view associated with the window 406 can be applied to the vertical plane 410 via the rendering component 110. For instance, visual data can be set back from the window 406 (e.g., parallel to the window 406) via the vertical plane 410. The vertical plane 410 can be implemented a certain distance behind a plane of the window 406 (e.g., behind the vertical plane 408). As such, the vertical plane 408 or the vertical plane 410 can be textured with a view out the window 406 based on at least one image corresponding to a window view (e.g., determined by the visual data component 108).

Figure 5:
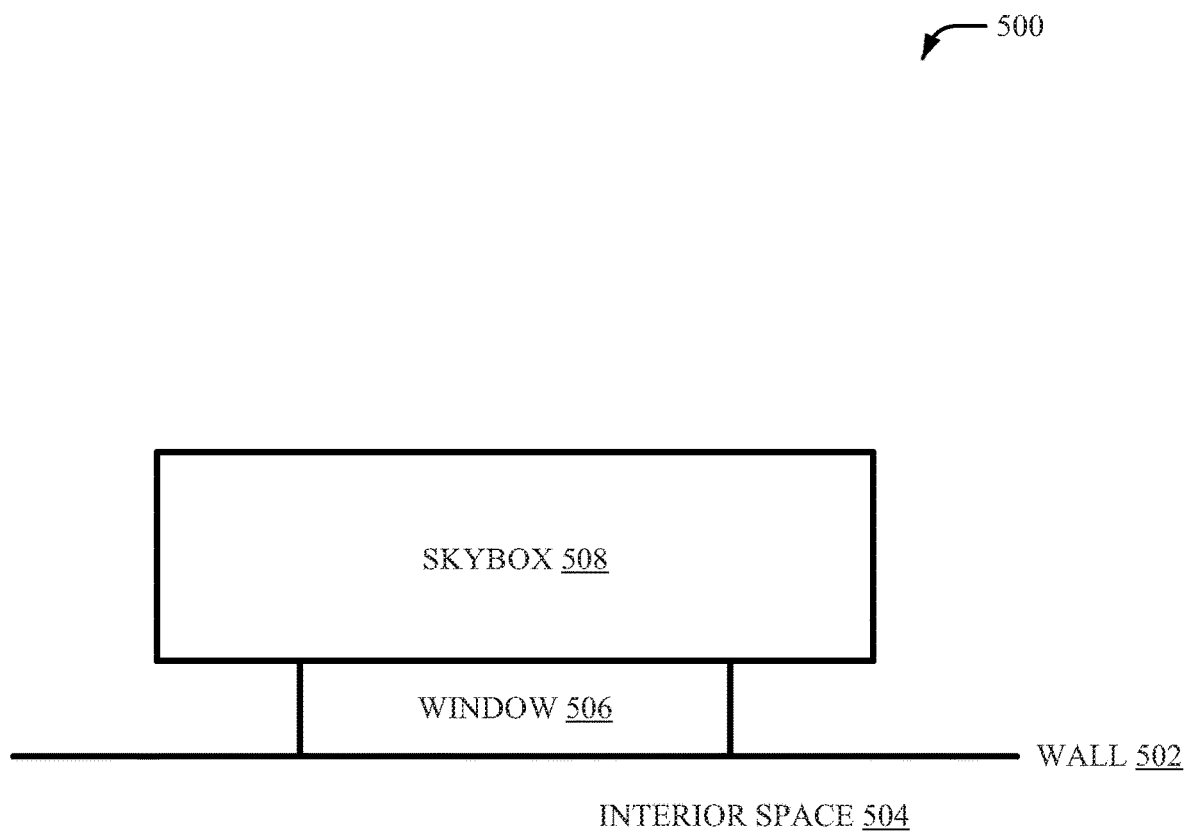
FIG. 5 illustrates a top-down view that includes an example skybox for rendering a window view, in accordance with various aspects and implementations described herein.

Referring to FIG. 5, there is illustrated a non-limiting implementation of a top-down view 500 in accordance with various aspects and implementations of this disclosure. The top-down view 500 includes a wall 502, an interior space 504, a window 506 and a skybox 508. In FIG. 5, the wall 502 can be at an edge of the interior space 504. The wall 502 can comprise the window 506. In an aspect, the skybox 508 can comprise one or more vertical planes and/or one or more horizontal planes. An opening of the skybox 508 can correspond to an opening along an edge of the skybox 508 where the skybox 508 converges with the window 506. In one example, a shape of the skybox can be cube. In another example, a shape of the skybox can be a rectangular prism. In another implementation, a shape of the skybox 508 can be a trapezoidal prism where a smaller parallel face of the trapezoidal prism converges with a window frame of the window 506. In yet another example, a shape of the skybox 508 can be a sphere. However, it is to be appreciated that the skybox 508 can be implemented as a different shape. Visual data for a window view associated with the window 506 can be applied to at least one surface associated with the skybox 508 and/or a 3D shape (e.g., a 3D shape generated by the 3D shape component 206) via the rendering component 110.

Figure 6:
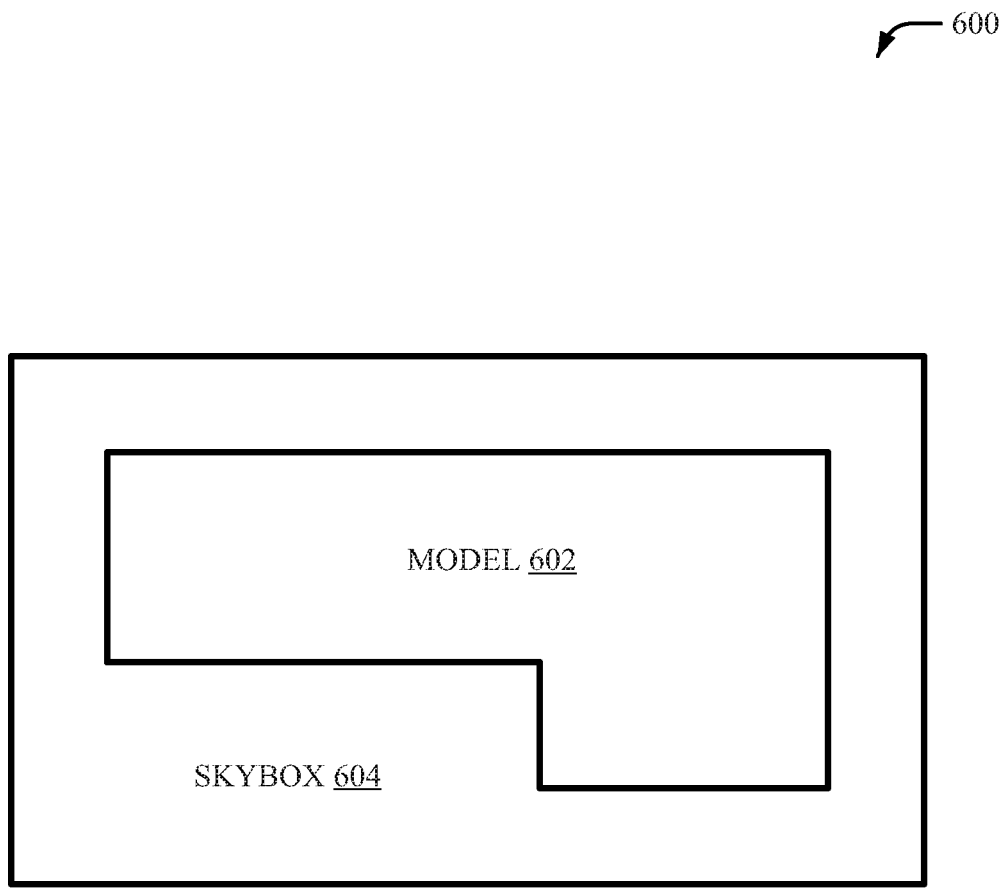
FIG. 6 illustrates a top-down view that includes another example skybox for rendering a window view, in accordance with various aspects and implementations described herein.

Referring to FIG. 6, there is illustrated a non-limiting implementation of a top-down view 600 in accordance with various aspects and implementations of this disclosure. The top-down view 600 includes a model 602 and a skybox 604. The model 602 can be a 3D model of an architectural environment (e.g., an indoor architectural environment and/or an outdoor architectural environment). For example, the model 602 can be a 3D model of a real-world location (e.g., a house, an apartment, a construction site, an office space, a commercial space, another living space, another working space, etc.). A 3D reconstruction system can employ 2D image data and/or depth data captured from 3D sensors (e.g., laser scanners, structured light systems, time-of-flight systems, etc.) to generate the model 602. The skybox 604 can be a single skybox implemented around the model 602. Visual data can be applied to at least one surface associated with the skybox 604 via the rendering component 110. In one example, the skybox 604 can be textured based on portions (e.g., sections, patches, etc.) of images of windows which are known to be background visual data. The portions of the images of windows can be projected onto the skybox 604 and/or merged based on one or more 2D image stitching techniques.

Figure 7:
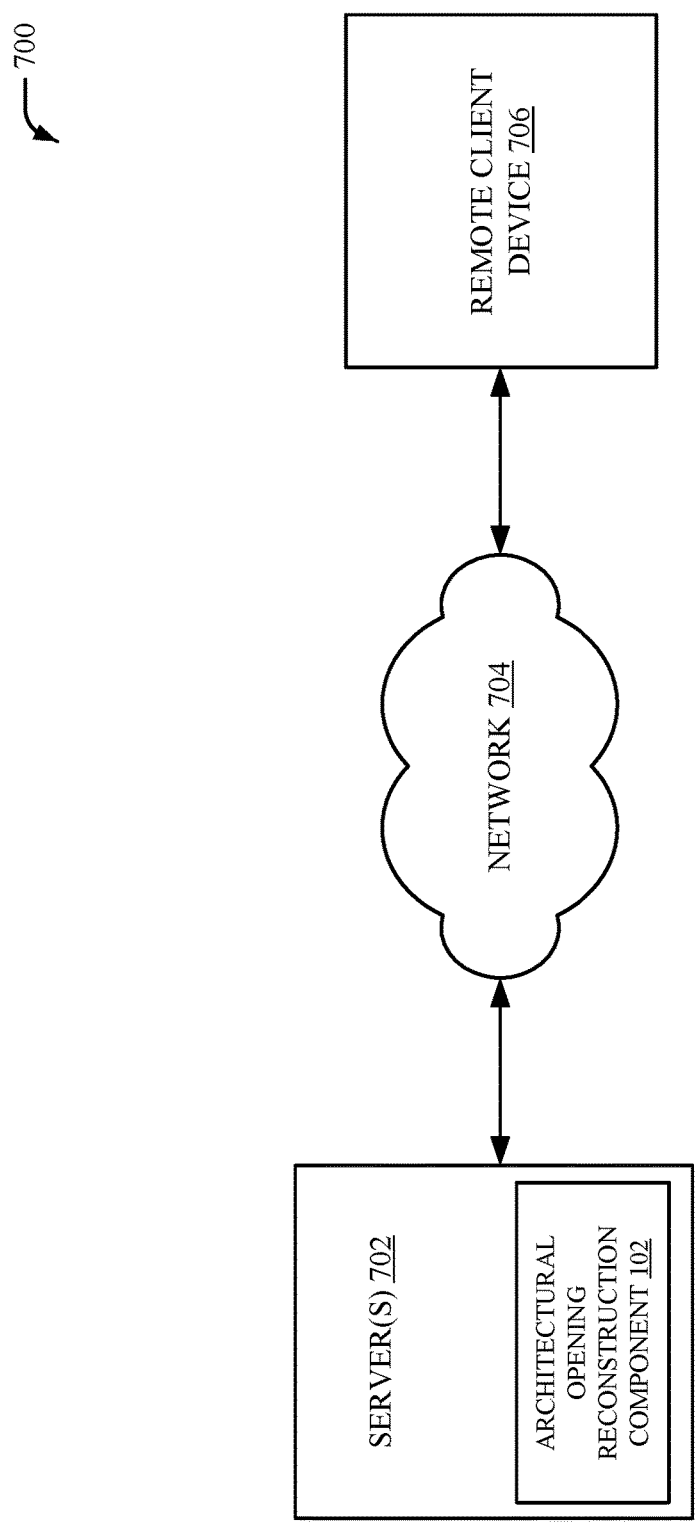
FIG. 7 illustrates a high-level block diagram of a system implementing the window component, in accordance with various aspects and implementations described herein.

Referring to FIG. 7, there is illustrated a non-limiting implementation of a system 700 in accordance with various aspects and implementations of this disclosure. The system 700 includes at least one server 702, a network 704 and a remote client device 706. The at least one server 702 can include at least the architectural opening reconstruction component 102. The architectural opening reconstruction component 102 can include the identification component 104, the spatial data component 106, the visual data component 108, the rendering component 110, the plane component 202, the skybox component 204 and/or the 3D shape component 206, each of which can respectively function as more fully disclosed herein.

The remote client device 706 can be configured to receive 3D data to render and/or display a 3D model and/or a floorplan (e.g., a 3D floorplan). A 3D model and/or a floorplan can be displayed on the remote client device 706 via a model viewer. In an aspect, the at least one server 702 can be associated with a 3D reconstruction system. In another aspect, the remote client device 706 can be associated with a user (e.g., a user identity, etc.). The remote client device 706 can provide user input data associated with a user (e.g., a user identity) to the server 702. In certain embodiments, the remote client device 706 can include, but is not limited to, a cellular phone (e.g., a smart phone), a tablet, a personal computer (PC), a desktop computer, a laptop computer, a camera, a 3D capture system, another portable computing device, etc. The at least one server 702 can be communicably coupled to the remote client device 706 via the network 704. The network 704 can include one or more networks. For example, network 704 can include one or more wireless networks and/or one or more wired networks, including but not limited to, a cellular network, a wide area network (WAN, e.g., the Internet), a local area network (LAN) and/or a personal area network (PAN). In an example, the at least one server 702 can transmit data for a 3D model and/or a floorplan to the remote client device 706 via the network 704. As such, the remote client device 706 can receive a 3D model and/or a floorplan via virtually any desired wireless or wired technology, including, for example, cellular, WAN, WiFi, etc. In an aspect, at least one component of the architectural opening reconstruction component 102 can be implemented on the remote client device 706 rather than the at least one server 702. For example, the rendering component 110 can be implemented on the remote client device 706. As such, data for a 3D model and/or a floorplan can be pre-rendered (e.g., when the rendering component 110 is implemented on the at least one server 702), or a 3D model and/or a floorplan can be rendered in real-time (e.g., when the rendering component 110 is implemented on the remote client device 706).

Figure 8:
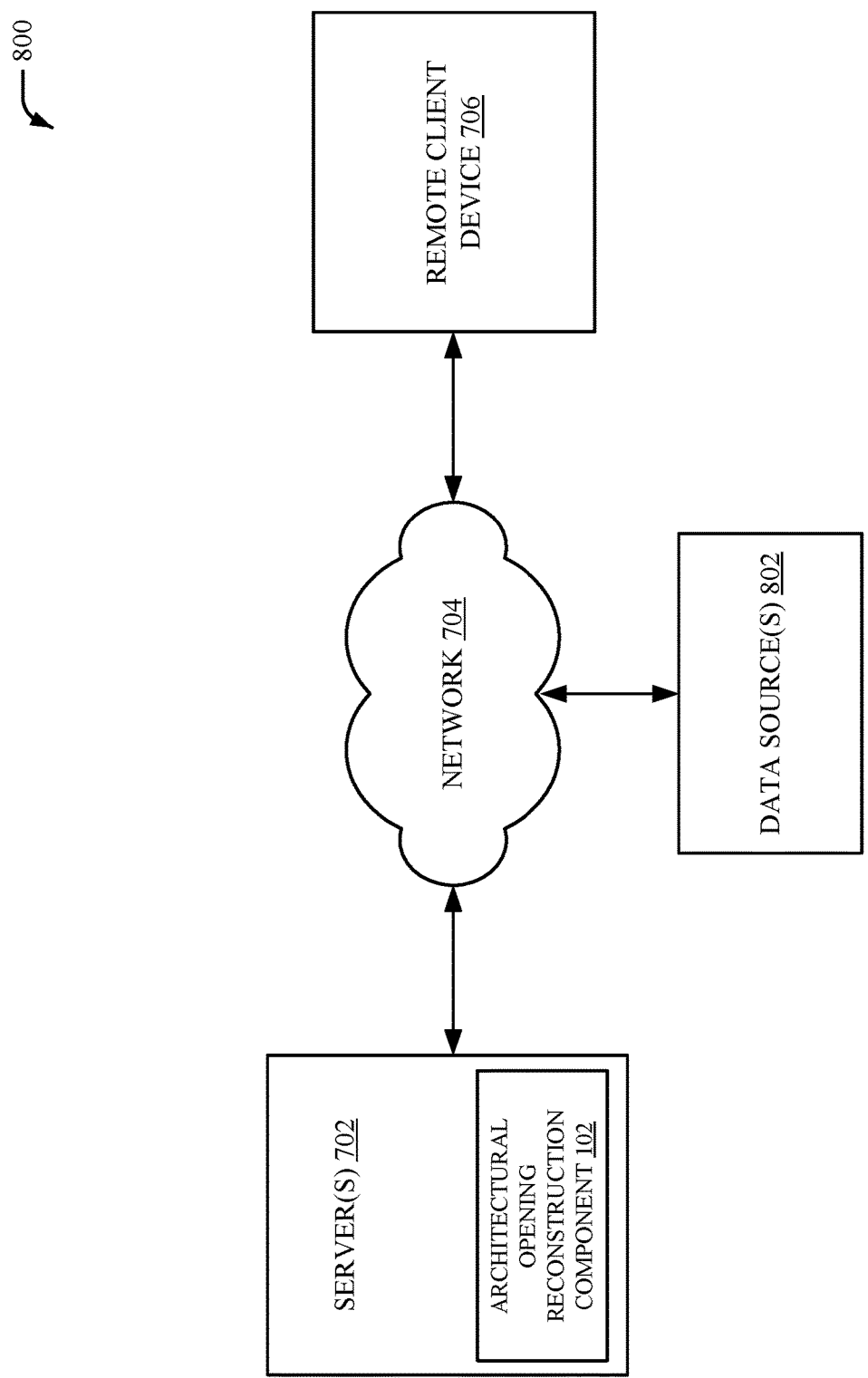
FIG. 8 illustrates a high-level block diagram of another system implementing the window component and data source(s), in accordance with various aspects and implementations described herein.

Referring to FIG. 8, there is illustrated a non-limiting implementation of a system 800 in accordance with various aspects and implementations of this disclosure. The system 800 includes the at least one server 702, the network 704 and the remote client device 706. Additionally, the system 800 includes data source(s) 802. The data source(s) 802 can provide visual data to the architectural opening reconstruction component 102 (e.g., the visual data component 108). For example, visual data provided by the data source(s) 802 can be applied to at least one surface associated with a 3D model.

The data source(s) 802 can be associated with one or more databases and/or one or more servers. In an aspect, the data source(s) 802 can be one or more third party data sources. The data source(s) 802 can store and/or be associated with a geographic model (e.g., a model of the earth). Additionally or alternatively, the data source(s) 802 can store and/or be associated with images related to a web mapping service application (e.g., location-based images, street map images, street view perspectives, panoramic images, satellite imagery, etc.). Additionally or alternatively, the data source(s) 802 can store and/or be associated with one or more geo-tagged images.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
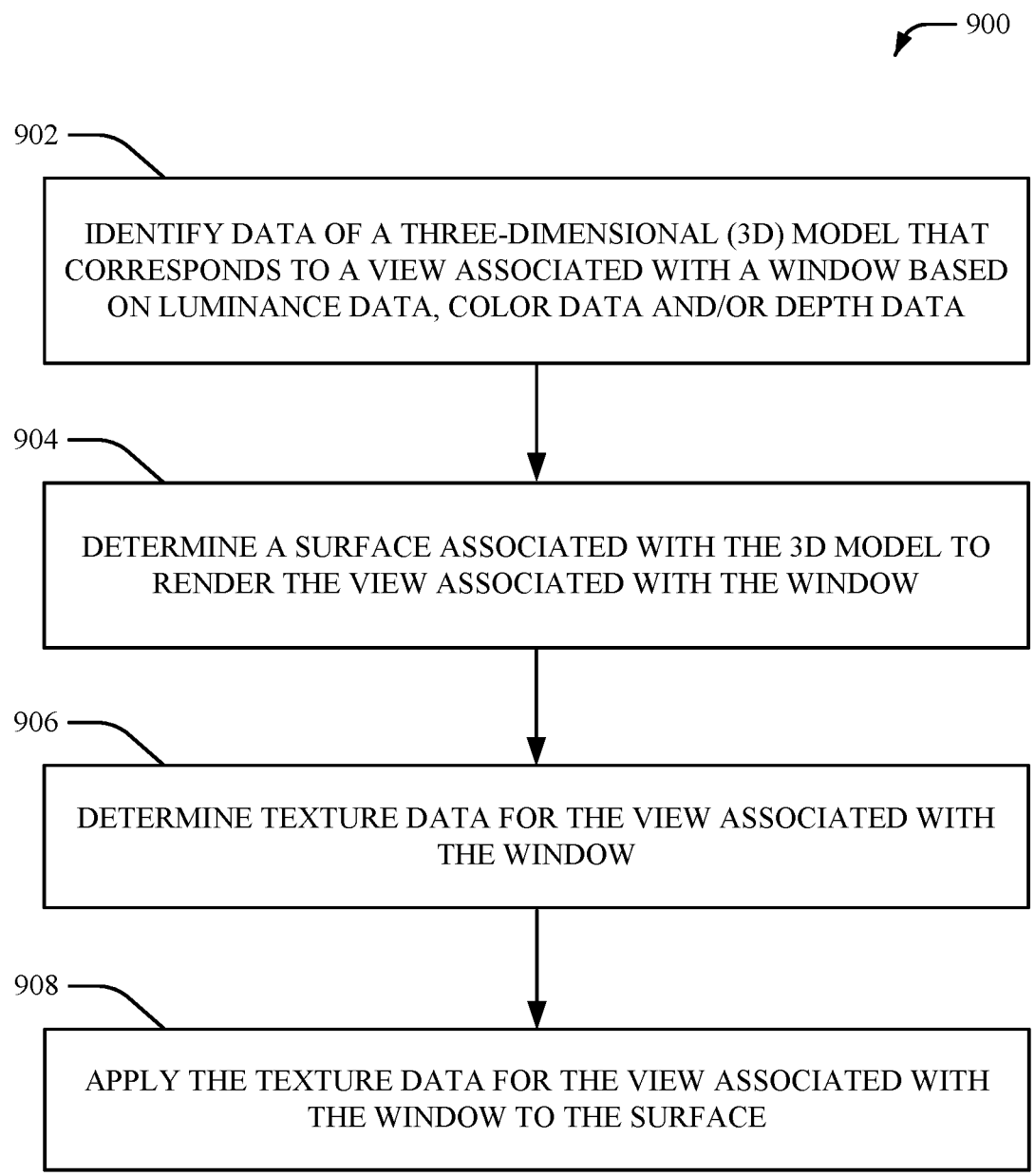
FIG. 9 depicts a flow diagram of an example method for determining and/or generating data for an opening area associated with a 3D model, in accordance with various aspects and implementations described herein.
Figure 10:
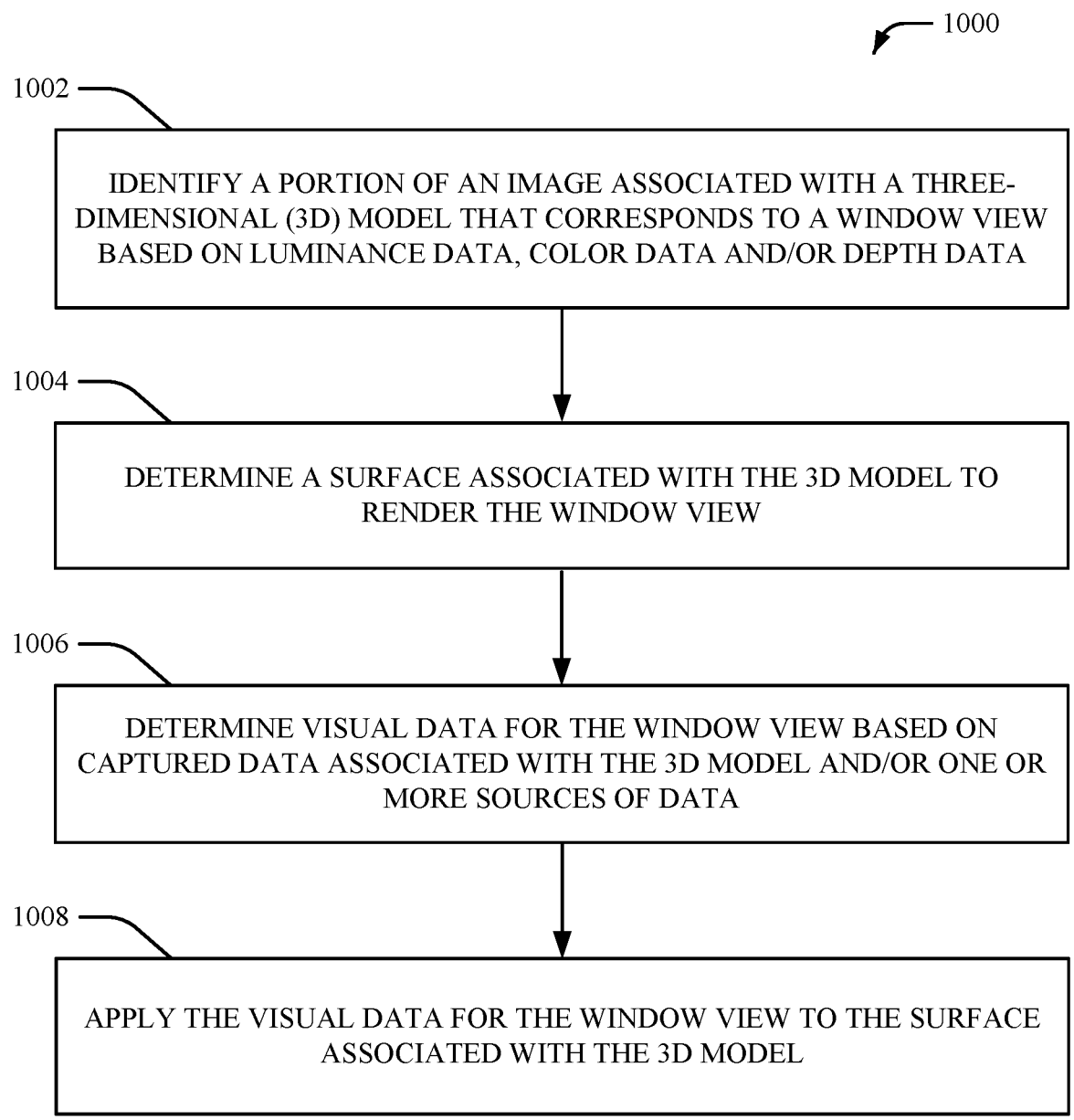
FIG. 10 depicts a flow diagram of another example method for determining and/or generating data for an opening area associated with a 3D model, in accordance with various aspects and implementations described herein.

FIGS. 9 and 10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for determining and/or generating data for an architectural opening area (e.g., a window area, a door area, a skylight area, etc.) associated with a 3D model, according to an aspect of the subject innovation. As an example, methodology 900 can be utilized in various applications, such as, but not limited to, 3D modeling systems, 3D reconstruction systems, server systems, cloud-based systems, client-side systems, etc.

At 902, data of a three-dimensional (3D) model that corresponds to a view associated with a window is identified (e.g., by an identification component 104) based on luminance data, color and/or depth data. For example, a portion of an image associated with a 3D model that corresponds to a window view can be identified based on data (e.g., luminance data, color and/or depth data) related to pixels of the image. It is to be appreciated that the view can be additionally or alternatively associated with a skylight and/or a door. As such, data of the 3D model that corresponds to a view associated with a skylight and/or a door can be additionally or alternatively identified.

At 904, a surface associated with the 3D model to render the view associated with the window is determined (e.g., by a spatial data component 106). In one example, a flat plane associated with the surface can be included in the 3D model. In another example, a flat plane associated with the surface can be generated and/or appended the 3D model. In yet another example, the surface can be associated with a skybox (e.g., a 3D shape).

At 906, texture data for the view associated with the window is determined (e.g., by a visual data component 108). For example, visual data for the view associated with the window can be determined based on one or more images, captured 2D data and/or captured 3D data.

At 908, the texture data for the view associated with the window is applied (e.g., by a rendering component 110) to the surface. For example, the visual data determined based on one or more images, captured 2D data and/or captured 3D data can be applied to the surface.

Referring to FIG. 10, there illustrated is a methodology 1000 for determining and/or generating data for an architectural opening area (e.g., a window area, a door area, a skylight area, etc.) associated with a 3D model, according to another aspect of the subject innovation. At 1002, a portion of an image associated with a three-dimensional (3D) model that corresponds to a window view is identified (e.g., by an identification component 104) based on luminance data, color data and/or depth data. For example, pixels associated with the window view and/or pixels that are not associated with the window view (e.g., pixels associated with an architectural window element, pixels associated with a window frame, pixels associated with a wall, etc.) can be identified based on luminance pixel data, color pixel data and/or depth pixel data. It is to be appreciated that the window view can additionally or alternatively be a skylight view and/or a door view. As such, a portion of the image associated with the 3D model that corresponds to a skylight view and/or a door view can be additionally or alternatively identified (e.g., by an identification component 104) based on luminance data, color data and/or depth data.

At 1004, a surface associated with the 3D model to render the window view is determined (e.g., by a spatial data component 106). For example, the surface can be a surface of a flat plane and/or a skybox.

At 1006, visual data for the window view is determined (e.g., by a visual data component 108) based on captured data associated with the 3D model and/or one or more sources of data. For example, visual data can be determined based on one or more images captured by a camera and/or a mobile device during a model capture process associated with the 3D model. Additionally or alternatively, visual data can be determined based on one or more third party data sources.

At 1008, the visual data for the window view is applied (e.g., by a rendering component 110) to the surface associated with the 3D model. In an aspect, the visual data applied to the surface can be modified based on position data and/or orientation data associated with a rendering of the 3D model on a remote client device (e.g., a remote client device configured for receiving and/or displaying the 3D model via a 3D model viewer).

Figure 11:
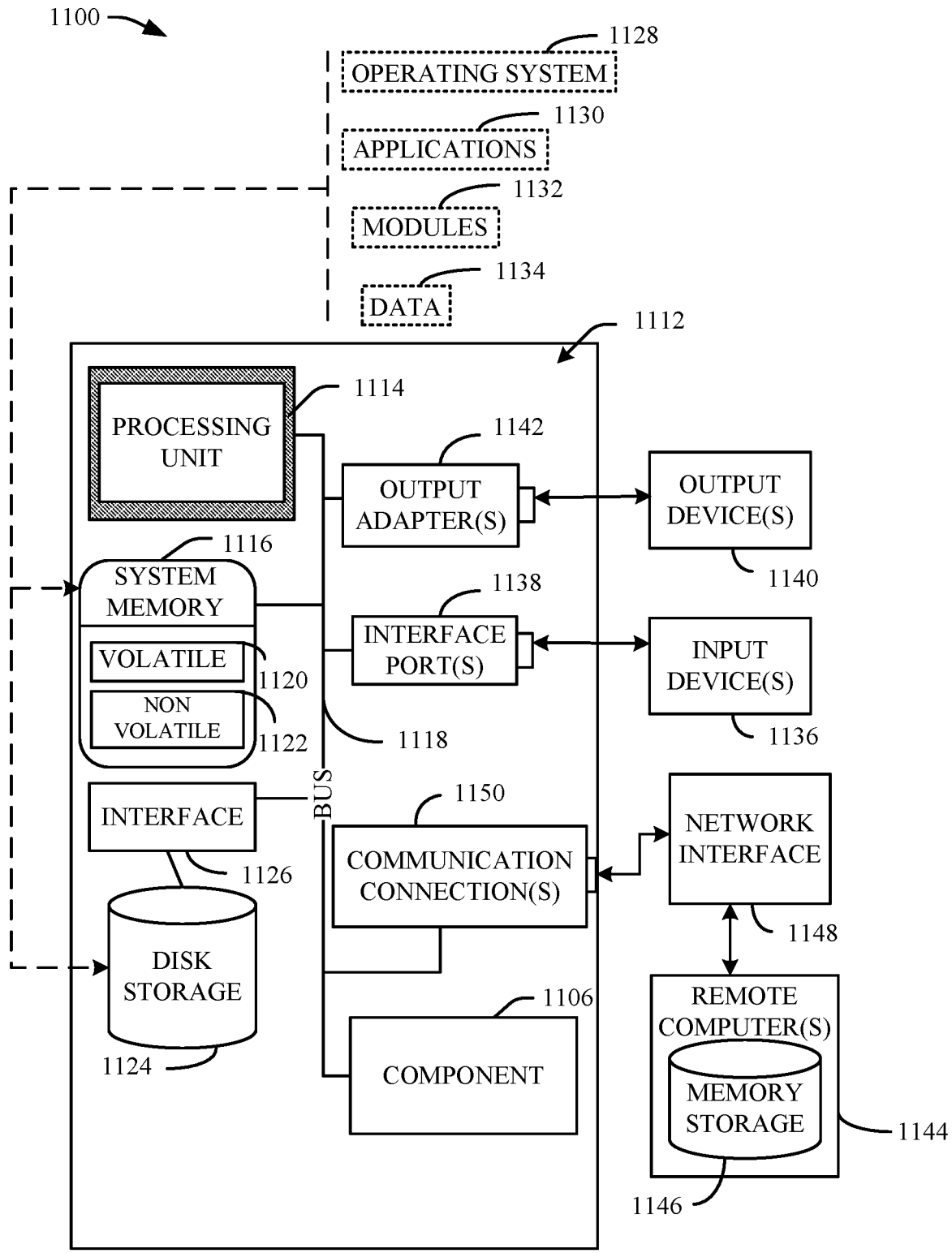
FIG. 11 is a schematic block diagram illustrating a suitable operating environment.
Figure 12:
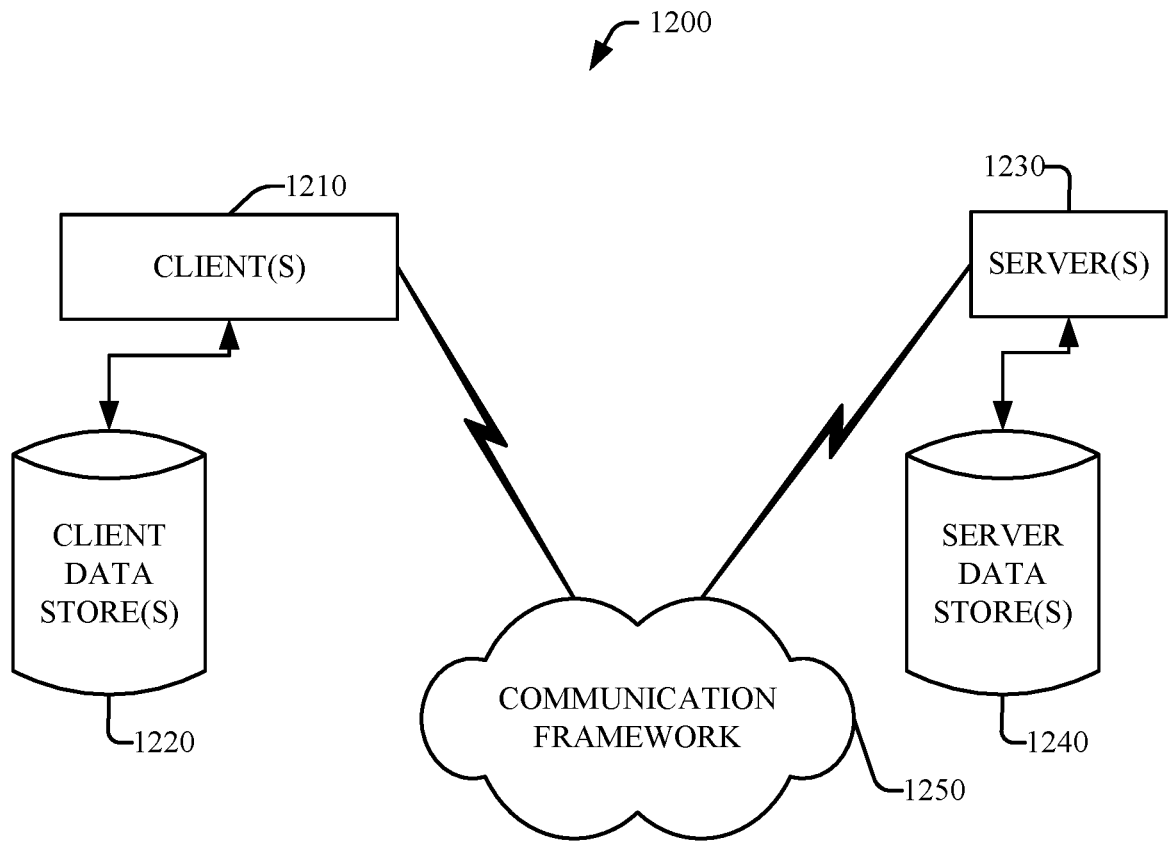
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems, components and/or methodologies shown and described in connection with FIGS. 1-8. In accordance with various aspects and implementations, the computer 1112 can be used to facilitate determining and/or generating data for a window area associated with a 3D model. In certain exemplary embodiments, the computer 1112 includes a component 1106 (e.g., an architectural opening reconstruction component 102) that can contain, for example, an identification component 104, a spatial data component 106, a visual data component 108, a rendering component 110, a plane component 202, a skybox component 204 and/or a 3D shape component 206, each of which can respectively function as more fully disclosed herein. In an aspect, the component 1106 can be implemented in and/or in connection with the system memory 1116.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., architectural opening reconstruction component, identification component, spatial data component, visual data component, rendering component, plane component, skybox component, 3D shape component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory storing computer executable components; and
    a processor configured to execute the following computer executable components stored in the memory:
        an identification component that identifies a portion of an image associated with a three-dimensional (3D) model that corresponds to a window view based at least in part on color data or depth data, wherein the 3D model is generated based on image data and the depth data captured from a set of 3D sensors;
        a spatial data component that determines a first surface to render the window view, wherein the first surface is parallel to a second surface of the 3D model, the second surface being associated with an opening area for the window view;
        a visual data component that determines visual data for the window view based on is a set of two-dimensional (2D) images that comprises 2D data for an outdoor area outside the 3D model, wherein the set of 2D images is captured at a geographic location associated with the window view; and
        a rendering component that applies the visual data for the window view to the first surface, the visual data being at least a portion of the set of 2D images that comprises the 2D data for the outdoor area outside the 3D model.

2. The system of claim 1, wherein the identification component further identifies the portion of the image that corresponds to the window view based on luminance data.

3. The system of claim 1, wherein the identification component further identifies the portion of the image that corresponds to the window view based on luminance data, the color data and the depth data.

4. The system of claim 1, wherein the identification component employs a machine learning technique.

5. The system of claim 1, wherein the spatial data component determines a flat plane included in the 3D model to render the window view.

6. The system of claim 1, wherein the spatial data component generates a flat plane that includes the first surface and appends the flat plane to the 3D model.

7. The system of claim 1, wherein the spatial data component computes spatial data associated with the window view based on photogrammetric analysis of image data viewed through the first surface.

8. The system of claim 1, wherein the visual data component determines the set of 2D images associated with the window view based on a 3D capturing process employed to generate the 3D model.

9. The system of claim 1, wherein the visual data component receives the set of 2D images associated with the window view based on from a third party data source that stores a set of geo-tagged images.

10. The system of claim 1, wherein the rendering data component determines the visual data for the window view based on a set of visual effects.

11. The system of claim 1, wherein the rendering data component modifies the visual data for the window view based on position data associated with a rendering of the 3D model on a remote client device.

12. The system of claim 1, wherein the visual data component determines the set of 2D images associated with the window view based on a camera device associated with a 3D capturing process employed to generate the 3D model.

13. The system of claim 1, wherein the rendering component applies the visual data to a plane parallel to a window of the 3D model that is associated with the window view.

14. The system of claim 1, wherein the rendering component applies the visual data to a skybox associated with the 3D model.

15. The system of claim 1, wherein the rendering component applies the visual data to a skybox for a window of the 3D model that is associated with the window view.

16. The system of claim 15, further comprising a skybox component that generates 3D data for at least one object included in the skybox.

17. A method, comprising:
    employing a processor that facilitates execution of computer executable instructions stored on a non-transitory computer readable medium to implement operations, comprising:
        generating a three-dimensional (3D) model based on image data and depth data captured from a set of 3D sensors;
        identifying data of the 3D model that corresponds to a view associated with an architectural opening area based at least in part on color data or the depth data;
        determining a first surface to render the view, wherein the first surface is parallel to a second surface of the 3D model, the second surface being associated with the architectural opening area;
        determining visual appearance data for the view associated with the architectural opening area, the visual appear data being a set of two-dimensional (2D) images that comprises 2D data for an outside area outside the 3D model, wherein the set of 2D images is captured at a geographic location associated with the view; and applying, to the first surface, the visual appearance data for the view, the visual appearance data being at least a portion of the set of 2D images that comprises the 2D data for the outside area outside the 3D model as the view.

18. The method of claim 17, wherein the identifying further includes identifying the data of the 3D model that corresponds to the view associated with the architectural opening area based on luminance data.

19. The method of claim 17, wherein the determining the first surface includes generating the first surface and appending the first surface to the 3D model.

20. The method of claim 17, wherein the determining the visual appearance data includes determining the visual appearance data based on geographic coordinates associated with the 3D model.

21. The method of claim 17, wherein the applying includes applying, to a surface of a skybox, the visual appearance data for the view related to the set of 2D images associated with the geographic location.

22. A computer readable storage device comprising instructions that, in response to execution, cause a system comprising a processor to perform operations, comprising:

generating a three-dimensional (3D) model based on image data captured from a set of 3D sensors;

identifying a portion of an image associated with the 3D model that corresponds to a window view or an architectural opening view based on data related to pixels of the image;

determining a first surface to render the window view or the architectural opening view, wherein the first surface is parallel to a second surface of the 3D model, the second surface being associated with an opening area for the window view or the architectural opening view;

determining visual data for the window view or the architectural opening view is a set of images that comprises two-dimensional (2D) data for an outdoor area not included in the 3D model, wherein the set of images is captured at a geographic location associated with the window view or the other architectural opening; and applying, to the first surface, the visual data for the window view or the architectural opening view, the visual data being the set of images that comprises the 2D data associated with the outdoor area outside the 3D model.

* * * * *